US006632536B2

(12) United States Patent
Buchwalter et al.

(10) Patent No.: US 6,632,536 B2
(45) Date of Patent: Oct. 14, 2003

(54) SELF-ASSEMBLED MONOLAYER ETCH BARRIER FOR INDIUM-TIN-OXIDE USEFUL IN MANUFACTURING THIN FILM TRANSISTOR-LIQUID CRYSTAL DISPLAYS

(75) Inventors: Stephen L. Buchwalter, Hopewell Junction, NY (US); Gareth Geoffrey Hougham, Ossining, NY (US); Kang-Wook Lee, Yorktown Heights, NY (US); John J. Ritsko, Mount Kisko, NY (US); Mary Elizabeth Rothwell, Ridgefield, CT (US); Peter M. Fryer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 09/752,019

(22) Filed: Dec. 28, 2000

(65) Prior Publication Data

US 2002/0084252 A1 Jul. 4, 2002

(51) Int. Cl.$^7$ .................................................. B32B 9/04
(52) U.S. Cl. ........................ 428/447; 428/446; 428/688
(58) Field of Search ................................. 428/428, 429, 428/446, 447, 448, 688

(56) References Cited

U.S. PATENT DOCUMENTS

| | | | | |
|---|---|---|---|---|
| 6,033,774 A | * | 3/2000 | Yitzchaik et al. | 428/333 |
| 6,127,127 A | * | 10/2000 | Eckhardt et al. | 435/6 |
| 6,159,695 A | * | 12/2000 | McGovern et al. | 435/6 |
| 2002/0093122 A1 | * | 7/2002 | Choi et al. | 264/401 |
| 2002/0094496 A1 | * | 7/2002 | Choi et al. | 430/322 |
| 2002/0098426 A1 | * | 7/2002 | Sreenivasan et al. | 430/22 |
| 2002/0115002 A1 | * | 8/2002 | Bailey et al. | 430/5 |
| 2002/0150398 A1 | * | 10/2002 | Choi et al. | 396/428 |

OTHER PUBLICATIONS

"Formation and Characterization of a Highly Ordered and Well–Anchored Alkylsilane Monolayer on Mica by Self–Assembly", Carl R. Kessel and Steve Granick, Langmuir 1991, 7, pp. 532–538.

"Adsorption of Bifunctional Organic Disulfides on Gold Surfaces", Ralph G. Nuzzo and David L. Allara, J. Am. Chem. Soc., 1983, vol. 105, pp. 4481–4483.

"Organized Monolayers by Adsorption. 1. Formation and Structure of Oleophobic Mixed Monolayers on Solid Surfaces", Jacob Sagiv, Journal of the American Chemical Society, 1980, 102:1, pp. 92–98.

"Features of gold having micrometer to centimeter dimensions can be formed through a combination of stamping with an elastomeric stamp and an alkanethiol "ink" followed by chemical etching", Amit Kumar and George M. Whitesides, Appl. Phys. Lett., 1993, vol. 63 (14), pp. 2002–2004.

\* cited by examiner

Primary Examiner—Robert Dawson
Assistant Examiner—Michael J Feely
(74) Attorney, Agent, or Firm—Perman & Green, LLP; Thomas L. Tully; Daniel P. Morris

(57) ABSTRACT

New etch barriers of indium-tin-oxide in the manufacturing process of thin film transistor-liquid crystal display are self-assembled monolayers, such as n-alkylsilanes. A typical process of applying a self-assembled monolayer is to ink a hydrolyzed n-octadecyltrimethoxysilane solution on to a stamp and then to transfer the solution onto ITO. The surface of the stamp may be polar enough to be wet with polar self-assembled monolayer solutions of an akylsilane. A non-polar stamp surface may be treated with oxygen plasma to obtain a wettable polar surface.

13 Claims, 2 Drawing Sheets

SELF-ASSEMBLED MONOLAYER ETCH BARRIER FOR INDIUM-TIN-OXIDE USEFUL IN MANUFACTURING THIN FILM TRANSISTOR-LIQUID CRYSTAL DISPLAYS

BACKGROUND OF THE INVENTION

1. Technical Field

This invention relates to liquid crystal displays (LCDs), and, more particularly to a method for etching indium-tin-oxide (ITO) electrodes and lines using self-assembled monolayers. More specifically, it relates to an etch barrier for indium-tin-oxide, a process for forming an etch pattern on a layer of indium-tin-oxide, and a method for preparing a stamp for transferring an etch barrier material.

2. Background Art

Flat panel displays have become increasingly important in computer industries and in other industries where the display of information is important. These types of displays provide unique opportunities for lowering the weight, size and eventually the cost of displaying information. Thin film transistor-liquid crystal displays (TFT-LCDs) seem to hold the most promise as the technology which will eventually be utilized in almost all practical flat panel displays. Considerable success has been achieved in small size color flat panel displays for consumer electronics as well as larger size color flat panel displays used in notebook or laptop computers.

A TFT-LCD device is made up of two substrates. One contains color filters and the other has TFT arrays. Since ITO is transparent and conductive, it is employed as an electrode or as a conductor on both substrates. It is important to be able to make a desired pattern of the ITO in modern displays. Conventionally, a photoresist and its lithographic processes are used to pattern the ITO. There has been a long felt need for a simplified process to pattern ITO, which will lower the manufacturing cost.

An alternative approach to lithography has been published by Kumar and Whitesides in Appl. Phys. Lett. 1993, 63, 2002–2004. In this process, known as microcontact stamp lithography, stamps are fabricated by casting a replica in poly(dimethylsiloxane) (PDMS) of a master with a negative of the desired pattern. The PDMS stamp is inked with hexadecanethiol, and transferred to gold substrate by transient contact between the stamp and the gold substrate.

The thiol covalently binds to the gold substrate, preventing spread of the bulk liquid phase and thus confining the transferred monolayer to the region of contact. The presence of these thiols allows subsequent lithographic processing of the gold using a cyanide/oxygen etch that selectively removes gold not protected by a monolayer of hexadecanethiol. But its scope is limited to special subset of useful materials, i.e., thiols and gold. In PCT WO 97/06012 and WO 97/06013, Biebuyck and Michel described a detailed method for application in electronic devices.

Self-assembled monolayers (SAMs) are thin organic monolayers of molecules having end groups selectively adsorbed to solid surfaces (R. G. Nuzzo and D. L. Allara, Journal of American Chemical Society vol. 105, pp. 4481–3, 1983). The solid is usually an inorganic material or a metal. SAMs of thiols adsorbed on gold have ordered structures, and their methylene (CH2) groups have all trans configurations. SAMs of n-octadecylsilane were prepared on glass surfaces using hydrolyzed n-octadecyltrichlorosilane (J. Sagiv, Journal of American Chemical Society, vol. 102, pp.92–98, 1980) or hydrolyzed n-octadecyltrimethoxysilane (C. R. Kessel and S. Granick, Langmuir, vol 7, pp. 532–538, 1991).

SUMMARY OF THE INVENTION

This invention is directed to new SAM materials, of for example, an alkylsilane, as etch barriers for indium-tin-oxide (ITO). The invention is also directed to a new method for applying SAMs to an ITO surface. The method can be used for both multi-domain LCDs and single-domain LCDs. It is applicable to both high density and low density liquid crystal displays. It can be used for direct view active matrix liquid crystal displays (AMLCD), and it can also be used for liquid crystal light valves, of both the transmissive and reflective types.

In one embodiment of the present invention, a self-assembled monolayer, such as an alkylsilane, is used as an etch barrier for ITO. The etching of ITO by a common ITOetch solution is prevented and a desired pattern can be formed by using n-octadecylsilane SAMs. The previously described stamping method may be used to apply SANs on ITO.

Thus, in accordance with the invention, an etch barrier for indium-tin-oxide comprising an alkyl-silane self-assembled monolayer on a layer of indium-tin-oxide, the indium-tin-oxide being disposed on a substrate. The alkylsilane is selected from the group consisting of n-dodecylsilane, tetradecylsilane, n-hexadecylsilane, n-octadecylsilane, alkylchlorosilanes, alkylmethoxysilanes, and alkylethoxysilanes. These materials are at least partially hydrolyzed or fully hydrolyzed, preferably in an alcoholic solvent, prior to being applied to the indium-tin-oxide. The concentration of alkylsilane in the alcoholic solution is in the range of 0.01 5.0 percent by volume, and preferably 0.1–0.5 volume percent by volume. Preferably, the alkylsilane is n-octadecyltrihydroxysilane. It may be formed from n-octadecyltrimethoxysilane that has been hydrolyzed.

The invention is also directed to a process for forming an etch pattern on a layer of indium-tin-oxide, comprising applying a self-assembled monolayer onto the indium-tin-oxide, such as an alkylsilane; and etching the indium-tin-oxide to form the etch pattern. The alkylsilane may be one of the materials mentioned above. The process may further comprise inking a stamp with a polar SAM precursor solution; and transferring the solution onto the indium-tin-oxide.

In a specific embodiment of the present invention, the process of applying SAMs onto ITO substrates comprises the steps of applying ink to a patterned stamp with an alcoholic solution of SAM precursors, and transferring the inked solution onto ITO substrates. In a typical embodiment, n-octadecyltrimethoxysilane (OTMS) is hydrolyzed to n-octadecyltrihydroxysilane in a solvent that is a mixture of isopropanol and water for 7–30 days. The concentration of OTMS is in the range of 0.1–1.0 volume %. Either partially or fully hydrolyzed solutions may be used. The solution is applied onto ITO and baked at 85 degree C. for 30 min and the n-octadecylsilane SAM is formed on ITO. ITO underneath the SAMs can not be etched with an acid, in particular 3.5% aqueous oxalic acid, at 35 degree C. for 5 min, while ITO (500 angstrom thick) which is not covered with a SAM is completely etched.

In accordance with the invention, the process of preparing stamps includes, if necessary, modifying the stamp surface with mild oxygen plasma treatment to make the surface wettable with the polar SAM precursor solution.

DETAILED DESCRIPTION OF THE PREFERRED EMBODIMENT

Figure 1:
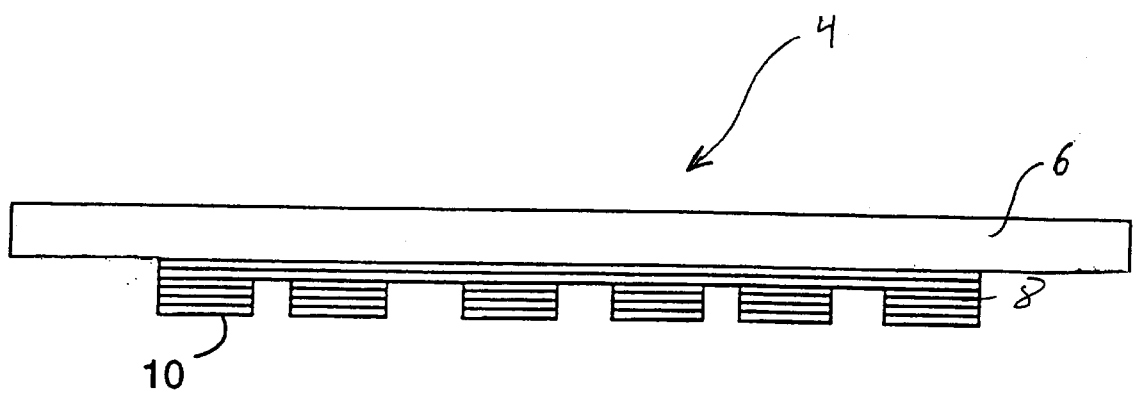
FIG. 1 is a schematic cross section of a patterned stamp.

FIG. 1 illustrates schematically a patterned stamp shown generally as 4. The patterned stamp includes a base 6 made of a material such as glass or a metal, which is used for handling or mounting of the stamp 4 in an appropriate apparatus such as a platan or offset press. The stamping portion 8 of stamp 4 defines a stamping surface 10. Portion 8 of stamp 4 may be made of a polymer such as PDMS which adheres to the base 6. The stamping surface is shaped by casting the PDMS material on to a mold surface (not shown) covered with an appropriate release agent, and peeling the material from the surface of the mold by pulling back on base 6 after the PDMS has set. The stamping surface 10 of the stamp 6 is treated to make it polar so that the SAM material will adhere to it to thus facilitate the use of the stamp for inking. A typical treatment is oxygen plasma. Typical parameters are oxygen flow of 200 sccm at an operating pressure of 110 to 300 millitorr and a power level of 200 to 500 watts. However, other gases such as nitrogen, ammonia, helium, argon, and fluorinated gases may also be used.

FIG. 2a to FIG. 2d illustrate schematically a stamping process to apply SAMs on an ITO substrate and then etch ITO which is uncovered with SAMs. In a typical process, to make a precursor solution of self-assembled monolayers, n-octadecyltrimethoxysilane (OTMS) is hydrolyzed to n-octadecyltrihydroxysilane in a solvent which is a mixture of isopropanol and water. Either partially or fully hydrolyzed solutions are employed. The stamping surface 10 is inked with this SAM precursor solution and then transferred onto ITO 12, which was deposited on glass 13 (FIG. 2a), as illustrated by SAM 14 in FIG. 2b.

Figure 2A:
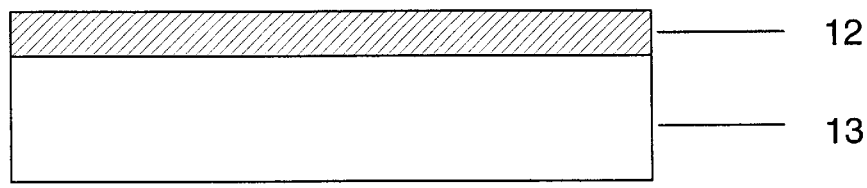
FIG. 2a to FIG. 2d illustrate schematically a stamping process for applying SAMs to an ITO substrate and then etching the ITO which is not covered with SAMs.
Figure 2B:
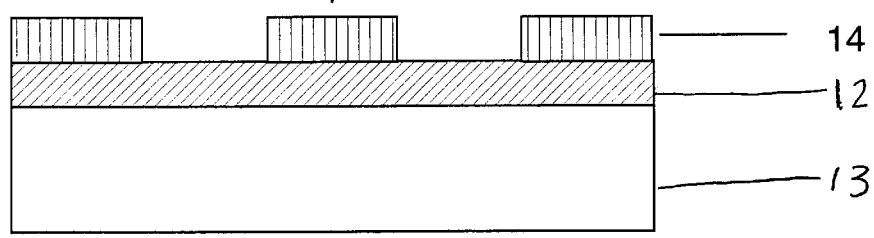
Figure 2C:
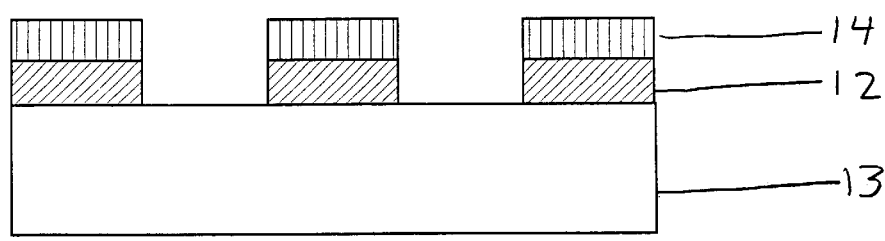

The ITO substrates is baked at 85° C. for 10–30 min to yield a stable SAM 14. The silane end groups are bound to ITO, the methyl end groups in n-octadecylsilane are oriented toward air, and the n-octadecyl chains are oriented almost perpendicular to the ITO surface. The substrate is dipped into an acid to selectively etch ITO 12 that was not covered with SAMs as illustrated in FIG. 2c.

Figure 2D:
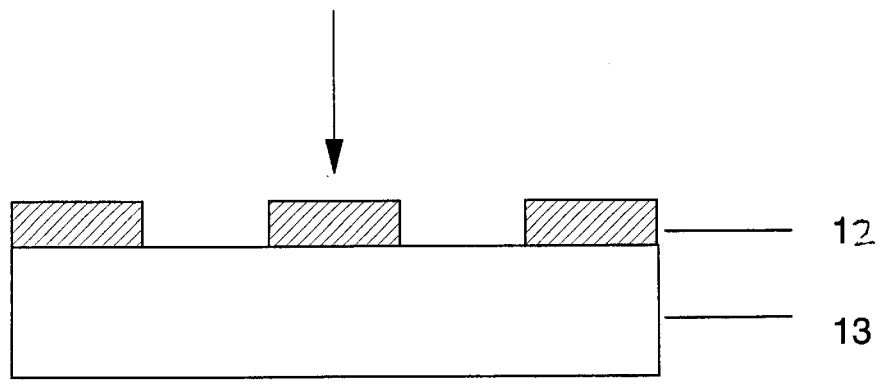

Finally, the SAMs are removed by a blanket etching process such as oxygen plasma as illustrated in FIG. 2d, and the ITO 12 that has been patterned is ready for the next process in the manufacturing of a TFT-LCD. The oxygen plasma process may use the same parameters as specified above for the treatment of surface 10; that is oxygen flow of 200 sccm at an operating pressure of 110 to 300 millitorr and a power level of 200 to 500 watts.

While the invention has been described in connection with specific embodiments, it will be understood that those with skill in the art may be able to develop variations of the disclosed embodiments without departing from the spirit of the invention or the scope of the following claims.

What is claimed is:

1. An etch barrier for indium-tin-oxide comprising a self-assembled monolayer of an alkylsilane on a layer of indium-tin-oxide, the indium-tin-oxide being disposed on a substrate.

2. The etch barrier of claim 1, wherein the alkylsilane is selected from the group consisting of: n-dodecylsilane, n-tetradecylsilane, n-hexadecylsilane, and n-octadecylsilane.

3. The etch barrier of claim 2 wherein the alkylsilane is at least partially hydrolyzed prior to being applied to the indium-tin-oxide.

4. The etch barrier of claim 2 wherein the alkylsilane is at least partially hydrolyzed in an alcoholic solvent prior to being applied to the indium-tin-oxide.

5. The etch barrier of claim 1, wherein the alkylsilane is selected from the group consisting of: alkylchlorosilanes, alkylmethoxysilanes, and alkylethoxysilanes.

6. The etch barrier of claim 5, wherein the alkylsilane is at least partially hydrolyzed prior to being applied to the indium-tin-oxide.

7. The etch barrier of claim 5, wherein the alkylsilane is at least partially hydrolyzed in an alcoholic solvent prior to being applied to the indium-tin-oxide.

8. The etch barrier of claim 1, wherein the alkylsilane is at least partially hydrolyzed prior to being applied to the indium-tin-oxide.

9. The etch barrier of claim 1, wherein the alkylsilane is at least partially hydrolyzed in an alcoholic solvent prior to being applied to the indium-tin-oxide.

10. The etch barrier of claim 9, wherein a concentration of alkylsilane in the alcoholic solution is in the range of 0.01–5.0 percent by volume.

11. The etch barrier of claim 9, wherein a concentration of alkylsilane in the alcoholic solution is in the range of 0.1–0.5 percent by volume.

12. The etch barrier of claim 1, wherein the alkylsilane is n-octadecyltrihydroxysilane.

13. The etch barrier of claim 12, wherein the n-octadecyltrihydroxysilane is n-octadecyltrimethoxysilane that has been hydrolyzed.

* * * * *